US007125817B2

(12) United States Patent
Ou et al.

(10) Patent No.: US 7,125,817 B2
(45) Date of Patent: *Oct. 24, 2006

(54) COMBINED CRACKING AND SELECTIVE HYDROGEN COMBUSTION FOR CATALYTIC CRACKING

(75) Inventors: John D. Y. Ou, Houston, TX (US); Neeraj Sangar, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 551 days.

This patent is subject to a terminal disclaimer.

(21) Appl. No.: 10/369,880

(22) Filed: Feb. 20, 2003

(65) Prior Publication Data

US 2004/0167013 A1    Aug. 26, 2004

(51) Int. Cl.
C10G 11/00    (2006.01)
B01J 29/00    (2006.01)

(52) U.S. Cl. .............. 502/64; 208/108; 208/109; 208/110; 208/111; 208/111.1; 208/111.15; 208/111.35; 208/112; 208/118; 208/120.01; 208/120.05; 208/120.1; 208/120.15; 208/120.2; 208/120.25; 208/120.3; 208/120.35; 585/444; 585/659; 585/800

(58) Field of Classification Search ............... 208/108, 208/109, 110, 111, 111.1, 111.15, 111.35, 208/112, 118, 120.01, 120.05, 120.1, 120.15, 208/120.2, 120.25, 120.3, 120.35; 585/444, 585/659, 800; 502/64
See application file for complete search history.

(56) References Cited

U.S. PATENT DOCUMENTS

| | | | |
|---|---|---|---|
| 3,769,237 A | 10/1973 | Ondrey et al. ............... 252/464 |
| 3,872,148 A | 3/1975 | Umemura et al. ........ 260/465.3 |
| 4,072,600 A | 2/1978 | Schwartz ..................... 208/120 |
| 4,107,032 A | 8/1978 | Chester ........................ 208/120 |
| 4,137,151 A | 1/1979 | Csicsery ...................... 208/120 |
| 4,208,269 A | 6/1980 | Gladrow et al. ............ 208/120 |
| 4,335,258 A | 6/1982 | Onoda et al. ................ 562/599 |
| 4,368,114 A | 1/1983 | Chester et al. .............. 208/120 |
| 4,368,346 A | 1/1983 | Eastman ...................... 585/658 |
| 4,419,270 A | 12/1983 | Ueshima et al. ............ 502/209 |
| 4,451,355 A | 5/1984 | Mitchell et al. ............. 208/113 |
| 4,454,025 A | 6/1984 | Hettinger, Jr. .............. 208/120 |
| 4,466,884 A | 8/1984 | Occelli et al. ............... 208/120 |
| 4,497,971 A | 2/1985 | Eastman et al. ............ 585/658 |
| 4,547,615 A | 10/1985 | Yamamoto ................... 585/621 |
| 4,568,790 A | 2/1986 | McCain ....................... 585/658 |
| 4,596,787 A | 6/1986 | Manyik et al. .............. 502/312 |
| 4,620,051 A | 10/1986 | Kolts et al. .................. 585/663 |
| 4,629,718 A | 12/1986 | Jones et al. .................. 502/241 |
| 4,689,436 A | 8/1987 | Minokani et al. ........... 585/422 |
| 4,777,319 A | 10/1988 | Kung et al. .................. 585/624 |
| 4,781,816 A | 11/1988 | Lee et al. ..................... 208/120 |
| 4,810,358 A | 3/1989 | Groenenboom .............. 208/121 |
| 4,861,936 A | 8/1989 | Sofranko et al. ............ 585/500 |
| 4,912,081 A | 3/1990 | Sofranko et al. ............ 502/207 |
| 4,921,946 A * | 5/1990 | Kocal et al. .................. 585/444 |
| 4,940,826 A | 7/1990 | Font Freide et al. ........ 585/600 |
| 4,957,718 A | 9/1990 | Yoo et al. ..................... 423/244 |
| 4,988,654 A | 1/1991 | Kennedy et al. .............. 502/84 |
| 5,002,653 A * | 3/1991 | Kennedy et al. ............. 208/118 |
| 5,021,145 A | 6/1991 | Chapple ........................ 208/120 |
| 5,043,522 A | 8/1991 | Leyshon et al. .............. 585/651 |
| 5,053,578 A | 10/1991 | Michaels et al. ............. 585/500 |
| 5,105,052 A | 4/1992 | Font Freide et al. ......... 585/651 |
| 5,167,795 A | 12/1992 | Gartside ......................... 208/67 |
| 5,194,413 A | 3/1993 | Kumar ........................... 502/65 |
| 5,254,779 A | 10/1993 | Mazzocchia et al. ........ 585/500 |
| 5,258,567 A | 11/1993 | Kerby et al. .................. 585/654 |
| 5,260,240 A | 11/1993 | Guthrie et al. ................ 502/41 |
| 5,306,858 A | 4/1994 | Salem et al. .................. 585/658 |
| 5,318,692 A * | 6/1994 | Eberly et al. ............. 208/120.1 |
| 5,340,554 A | 8/1994 | Carnell ......................... 423/235 |
| 5,365,006 A | 11/1994 | Serrand ........................ 585/501 |
| 5,378,349 A | 1/1995 | Senn ............................. 208/121 |
| 5,380,692 A | 1/1995 | Nakatsuji et al. ............ 502/303 |

(Continued)

FOREIGN PATENT DOCUMENTS

EP    0 201 152 A2    11/1986

(Continued)

OTHER PUBLICATIONS

Abstract, Mizuno et al., "*Selective oxidative dehydrogenation of propane at 380° C. by $Cs_{2.5}Cu_{0.08}H_{3.34}PV_3Mo_9O_{40}$ catalyst*", Applied Catalysis A: General 146 (1996) pp. L249-L254, Elsevier Science.

(Continued)

Primary Examiner—Glenn Caloarola
Assistant Examiner—Prem C. Singh
(74) Attorney, Agent, or Firm—Andrew B. Griffis

(57) ABSTRACT

A catalyst system and process for combined cracking and selective hydrogen combustion of hydrocarbons are disclosed. The catalyst comprises (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder. The process is such that the yield of hydrogen is less than the yield of hydrogen when contacting the hydrocarbons with the solid acid component alone.

27 Claims, No Drawings

U.S. PATENT DOCUMENTS

| | | | |
|---|---|---|---|
| 5,386,074 A | 1/1995 | Durante et al. | 585/658 |
| 5,414,181 A | 5/1995 | Bearden et al. | 585/654 |
| 5,443,807 A | 8/1995 | Tang et al. | 423/247 |
| 5,476,981 A | 12/1995 | Umansky et al. | 585/656 |
| 5,486,284 A | 1/1996 | Degnan et al. | 208/120 |
| 5,527,979 A | 6/1996 | Agaskar et al. | 585/659 |
| 5,530,171 A | 6/1996 | Agaskar et al. | 585/659 |
| 5,550,309 A | 8/1996 | Maunders et al. | 585/654 |
| 5,625,111 A | 4/1997 | Astbury et al. | 585/653 |
| 5,639,929 A | 6/1997 | Bharadwaj et al. | 585/658 |
| 5,670,037 A | 9/1997 | Zaiting et al. | 208/114 |
| 5,846,402 A | 12/1998 | Mandal et al. | 208/113 |
| 5,861,530 A | 1/1999 | Atkins et al. | 560/247 |
| 5,866,737 A | 2/1999 | Hagemeyer et al. | 585/443 |
| 5,905,180 A | 5/1999 | Yokoyama et al. | 585/658 |
| 5,907,076 A * | 5/1999 | Ou et al. | 585/800 |
| 6,015,931 A | 1/2000 | Wu et al. | 585/649 |
| 6,130,183 A | 10/2000 | Herskowitz et al. | 502/349 |
| 6,133,386 A | 10/2000 | Morrell et al. | 526/130 |
| 6,153,089 A | 11/2000 | Das et al. | 208/134 |
| 6,169,202 B1 | 1/2001 | Wijesekera et al. | 562/549 |
| 6,300,534 B1 | 10/2001 | Konishi et al. | 585/441 |
| 6,355,854 B1 | 3/2002 | Liu | 585/658 |
| 6,459,006 B1 | 10/2002 | Ou et al. | 585/454 |
| 2001/0025129 A1 | 9/2001 | Liu | 585/661 |
| 2003/0091485 A1 | 5/2003 | Bierl et al. | 422/189 |
| 2003/0181325 A1 | 9/2003 | Ou et al. | 502/302 |

FOREIGN PATENT DOCUMENTS

| | | |
|---|---|---|
| EP | 0 318 808 A2 | 6/1989 |
| EP | 0 425 666 A1 | 5/1991 |
| EP | 0 381 870 B1 | 5/1993 |
| EP | 0 921 175 A1 | 6/1999 |
| EP | 0 921 179 A1 | 6/1999 |
| EP | 1 077 082 A1 | 2/2001 |
| WO | WO 00/16901 A1 | 3/2000 |
| WO | WO 03/050065 A1 | 6/2003 |

OTHER PUBLICATIONS

Handbook of Petroleum Refining Processes, Third Edition, McGraw-Hill, New York, Robert A. Meyers, entitled "Thermodynamics of Catalytic Cracking", pp. 3.53.

* cited by examiner

COMBINED CRACKING AND SELECTIVE HYDROGEN COMBUSTION FOR CATALYTIC CRACKING

BACKGROUND OF THE INVENTION

Field of the Invention

The present invention relates to a novel catalyst composition and its use in a novel hydrocarbons cracking process. The catalyst is particularly useful in reducing the concentration of hydrogen in cracking products.

DISCUSSION OF BACKGROUND INFORMATION

Current cracking technologies for the production of light olefin (e.g., ethylene, propane and, optionally, butylenes), gasoline and other cracked products such as light paraffins and naphtha can be classified into the two categories of thermal cracking (also known as steam cracking) and catalytic cracking. While these technologies have been practiced for many years and are considered the workhorses for light-olefin production, both have disadvantages.

Steam or thermal cracking, a robust technology that does not utilize catalyst, produces the more valuable ethylene as the primary light olefin product. It is particularly suitable for cracking paraffinic feedstocks to a wide range of products including hydrogen, light olefins, light paraffins, and heavier liquid hydrocarbon products such as pyrolysis gasoline, steam cracked gas oil, etc. However, steam cracking is an expensive, complex technology due to required special construction material to sustain high cracking temperatures (~850° C.) and high energy input. Sulfur addition is required to passivate the furnace metal surfaces on a continuous basis, creating such undesirable side effects as environmental and product contamination. Steam cracking is not considered to be suitable for cracking feeds containing high concentrations of light olefins as it makes high levels of low value heavy by-products due to the more reactive nature of the olefin feeds. In addition, steam cracking makes a relatively low amount of propylene, and, therefore, is not considered suitable for meeting the anticipated growing demand for propylene in the future. Also, steam cracking requires steam dilution to control product selectivity and to maintain an acceptable run length; steam dilution is costly in terms of capital investment and energy consumption.

Current catalytic cracking technologies employ solid acid catalysts such as zeolites to promote cracking reactions. Unlike steam cracking technology, propylene is the primary light olefin product of catalytic cracking. Accordingly, catalytic cracking would be considered as the main source for growing propylene demand. Catalytic cracking can be classified into the following two general categories. The first category is Fluid Catalytic Cracking (FCC), which is the preferred refining process for converting higher boiling petroleum fractions into lower boiling products, such as gasoline, cracked naphtha and light olefins. The FCC catalyst of fine particles acts like a fluid and circulates in a closed cycle between a cracking reactor and a separate regenerator. In general, FCC catalysts can be classified into two categories—FCC base catalysts and FCC additive catalysts. Typical FCC catalysts contain the base catalysts which comprise a zeolite component and a matrix component. The zeolite is a major contributor for the catalyst activity, selectivity and stability. Examples of the zeolite component include Y zeolite and beta zeolite. The zeolite usually is treated with various modifications such as dealumination, rare earth exchange, phosphorous treatment, etc. Examples of typical matrix materials include amorphous compounds such as silica, alumina, silica-alumina, silica-magnesia, and clays such as kaolinite, halloysite or montmorillonite. The matrix component can serve several purposes. It can be used to bind the zeolite component to form catalyst particles. It can serve as a diffusion medium for the transport of feed and product molecules. It also can act as a filler which dilutes the zeolite particles to moderate the catalyst activity. In addition, the matrix can help heat transfer.

Some FCC catalysts also contain FCC additive catalyst(s), including, by way of non-limiting examples, octane-boosting additive, metal passivation additives, SOx reduction additives, NOx reduction additives, CO oxidation additives, coke oxidation additives, etc. The additive catalyst(s) can be either incorporated into the base catalyst matrix or used as separate catalyst particles. When used as separate catalyst particles, the additive catalyst(s) will contain in addition to the catalytic active components their own matrix materials, which may or may not be the same as the base catalyst matrix. Examples (U.S. Pat. No. 4,368,114, which is incorporated herein by reference in its entirety) of the main catalytic components for octane-boosting catalysts include ZSM-5 zeolite, ZSM-11 zeolite, beta zeolite, etc. Examples of SOx reduction additives include magnesia, ceria-alumina, rare earths on alumina, etc. Examples of CO oxidation additives include platinum and/or palladium either directly added to the base catalyst at trace levels or dispersed on a support such as alumina or silica alumina (U.S. Pat. Nos. 4,072,600 and 4,107,032, which are incorporated herein by reference in their entirety). Non-limiting examples of coke oxidation promoters include lanthanum and iron embedded in the base catalyst (U.S. Pat. No. 4,137,151, which is incorporated herein by reference in its entirety). Examples of metal passivation additives include barium titanium oxide (U.S. Pat. No. 4,810,358, which is incorporated herein by reference in its entirety), calcium-containing additives selected from the group consisting of calcium-titanium, calcium-zirconium, calcium-titanium-zirconium oxides and mixtures thereof (U.S. Pat. No. 4,451,355, which is incorporated herein by reference in its entirety), and antimony and/or tin on magnesium-containing clays (U.S. Pat. No. 4,466,884, which is incorporated herein by reference in its entirety).

For a riser FCC unit, fresh feed contacts hot catalyst from the regenerator at the base of the riser reactor. The cracked products are discharged from the riser to pass through a main column, which produces several liquid streams and a vapor stream containing hydrogen, methane, ethane, propane, butane, and light olefins. The vapor stream is compressed in a wet gas compressor and charged to the unsaturated gas facility for product purification. Another technology in this category is moving bed cracking or Thermofor Catalytic Cracking (TCC). The TCC catalyst is in the form of small beads, which circulate between a reactor and a regenerator in the form of a moving bed. A further description of the FCC process may be found in the monograph, "Fluid Catalytic Cracking with Zeolite Catalysts," P. B. Venuto and E. T. Habib, Marcel Dekker, New York, 1978, incorporated by reference.

The second category of catalytic cracking is catalytic cracking of naphtha, the main purpose of which is the generation of light olefins. Either FCC-type reactor/regenerator technology (U.S. Pat. No. 5,043,522, which is incorporated herein by reference in its entirety), or fixed-bed reactor technology (EP0921175A1 and EP0921179A1, which are incorporated herein by reference in their entirety), can be used. The products, which include liquid streams and a vapor stream of hydrogen, methane, ethane, propane, butane, and light olefins go through a series of treatments similar to that for the FCC products.

As pointed out above, current cracking technologies typically produce vapor streams containing mixtures of hydrogen, light paraffins (e.g., methane, ethane, propane, and optionally, butanes) and light olefins. In some cases, such as ethane cracking, hydrogen is recovered in high purity as a valued product. In many other cases, such as steam cracking of naphtha, FCC of gas oil, catalytic cracking of olefinic naphtha, etc., hydrogen is undesirable due to the difficulty of separating $H_2$ from the light olefins (ethylene and propylene). The presence of even a moderate quantity of $H_2$ in cracked products necessitates such expensive equipment as multi-stage gas compressors and complex chill trains, which contribute significantly to the cost of olefin production. If cracked products could be produced with minimal or no hydrogen in the reactor effluent, a significant cost saving could be realized for grassroots plants and for debottlenecking existing plants, and lower olefin manufacturing cost could be realized.

Conventional approaches to deal with the hydrogen issue have focused on post-reactor separation. That is, attempts have been made to use various reaction and/or separation techniques such as pressure swing adsorption or membranes to remove hydrogen from the olefins. However, these technologies suffer from a few disadvantages. First, they mostly operate at relatively high pressure (>7 atmospheres), which does not help reduce the burden on the compressors. Second, these technologies are expensive. Third, their performance of separating the olefin product into a $H_2$-rich stream and a $H_2$-poor stream is often unsatisfactory. A typical problem has been the loss of olefins to the hydrogen-rich stream due to an incomplete separation. As a result, many commercial plants still employ the complex and costly high-pressure cryogenic separation.

U.S. Pat. No. 4,497,971, which is incorporated herein by reference in its entirety, relates to an improved catalytic process for the cracking and oxidative dehydrogenation of light paraffins, and a catalyst therefor. According to this patent, a paraffin or mixtures of paraffins having from 2 to 5 carbon atoms is oxidatively dehydrogenated in the presence of a cobalt-based catalyst composition which not only has oxidative dehydrogenation capabilities but also has the capability to crack paraffins having more than two carbon atoms so that a paraffin such as propane can be converted to ethylene. If the feed to the oxidative dehydrogenation process contains paraffins having more than two carbon atoms, some cracking of such paraffins will occur at the conditions at which the oxidative dehydrogenation process is carried out.

U.S. Pat. No. 4,781,816, which is incorporated herein by reference in its entirety, relates to a catalytic cracking process and to a process for cracking heavy oils. It is an object of the disclosed invention to provide a process for cracking hydrocarbon-containing feedstocks, which contain vanadium compounds as impurities. According to this patent, the feedstream to be treated contains at least about 5 wppm vanadium. The catalyst comprises a physical mixture of zeolite embedded in an inorganic refractory matrix material, and at least one oxide of a metal selected from the group consisting of Be, Mg, Ca, Sr, Ba and La (preferably MgO) on a support material comprising silica.

U.S. Pat. No. 5,002,653, which is incorporated herein by reference in its entirety, relates to an improved catalytic cracking process using a catalyst composition for use in the conversion of hydrocarbons to lower-boiling fractions. More particularly, the invention comprises a process for using a dual component catalyst system for fluid catalytic cracking, which catalyst demonstrates vanadium passivation and improved sulfur tolerance. The catalyst comprises a first component comprising a cracking catalyst having high activity, and, a second component, as a separate and distinct entity, the second component comprising a calcium/magnesium-containing material in combination with a magnesium-containing material, wherein the calcium/magnesium-containing compound is active for metals trapping, especially vanadium trapping.

U.S. Pat. No. 5,527,979, which is incorporated herein by reference in its entirety, relates to a catalytic oxidative dehydrogenation process for alkane molecules having 2–5 carbon atoms. It is an object of the disclosed invention to provide a process for dehydrogenation of alkanes to alkenes. More particularly, the invention comprises a process of at least two reactors in series, in which an alkane feed is dehydrogenated to produce alkene and hydrogen over an equilibrium dehydrogenation catalyst in a first reactor, and the effluent from the first reactor, along with oxygen, is passed into a second reactor containing a metal oxide catalyst which serves to selectively catalyze the combustion of hydrogen. At least a portion of the effluent from the second reactor is contacted with a solid material comprising a dehydrogenation catalyst to further convert unreacted alkane to additional quantities of alkene and hydrogen. The equilibrium dehydrogenation catalyst comprises at least one metal from Cr, Mo, Ga, Zn and a metal from Groups 8–10. The metal oxide catalyst comprises an oxide of at least one metal from the group of Bi, In, Sb, Zn, Tl, Pb and Te.

U.S. Pat. No. 5,530,171, which is incorporated herein by reference in its entirety, relates to a catalytic oxidative dehydrogenation process for alkane molecules having 2–5 carbon atoms. It is an object of the disclosed invention to provide a process for dehydrogenation of alkanes to alkenes. More particularly, the invention comprises a process of simultaneous equilibrium dehydrogenation of alkanes to alkenes and combustion of the hydrogen formed to drive the equilibrium dehydrogenation reaction further to the product alkenes. The process involves passing the alkane feed into a reactor containing both an equilibrium dehydrogenation catalyst and a reducible metal oxide, whereby the alkane is dehydrogenated and the hydrogen produced is simultaneously and selectively combusted in oxidation/reduction reaction with the reducible metal oxide. The process further comprises interrupting the flow of alkane into the reaction zone, reacting the reduced metal oxide with a source of oxygen to regenerate the original oxidized form of the reducible metal oxide, and resuming the reaction in the reaction zone using the regenerated from of the reducible metal oxide. The dehydrogenation catalyst comprises Pt or Pd, and the reducible metal oxide is an oxide of at least one metal from the group of Bi, In, Sb, Zn, Tl, Pb and Te.

U.S. Pat. No. 5,550,309, which is incorporated herein by reference in its entirety, relates to a catalytic dehydrogenation process for a hydrocarbon or oxygenated hydrocarbon feed. More particularly, the invention comprises a process of contacting the feed with a catalyst bed comprising a dehydrogenation catalyst and a porous coated hydrogen retention agent in which the dehydrogenation catalyst produces a product stream of a dehydrogenated product and hydrogen and the porous coated hydrogen retention agent selectively removes, adsorbs or react with some of the hydrogen from the product stream, removing the reaction products from the reaction chamber, removing the adsorbed hydrogen from the hydrogen retention agent or oxidizing the reduced hydrogen retention agent to regenerate the hydrogen retention agent, and using the regenerated hydrogen retention agent for reaction with feed.

U.S. Pat. No. 4,466,884, which is incorporated herein by reference in its entirety, relates to a catalytic cracking process for feedstocks having high metals content such as vanadium, nickel, iron and copper. More particularly, the invention comprises a process of contacting the feed with a catalyst composition comprising a solid cracking catalyst and a diluent containing antimony and/or tin. The solid cracking catalyst is to provide good cracking activity. The diluent can be compound or compounds having little activity such as magnesium compounds, titanium compounds, etc. The function of the antimony and/or tin in the diluent is to react with the nickel or vanadium in the feedstocks to form inert compounds thereby reducing the deactivating effects of nickel and vanadium on the solid cracking catalyst.

U.S. Pat. No. 4,451,355, which is incorporated herein by reference in its entirety, relates to a hydrocarbon conversion process for feedstocks having a significant concentration of vanadium. More particularly, the invention comprises a process of contacting the feed having a significant concentration of vanadium with a cracking catalyst containing a calcium containing additive selected from the group consisting of calcium-titanium, calcium-zirconium, calcium-titanium-zirconium oxides and mixtures thereof. A preferred calcium additive is a calcium titanate perovskite (CaTiO3) or calcium zirconate (CaZrO3) perovskite. It is theorized that addition of the calcium-containing additive prevents the detrimental vanadium interaction with the zeolite in the cracking catalyst by acting as a sink for vanadium.

A significant need exists for a cracking technology that overcomes the previously discussed disadvantages of present, commercial cracking technology due to of the presence of hydrogen in cracked products.

SUMMARY OF THE INVENTION

One aspect of the present invention relates to a catalyst system comprising (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder.

The solid acid component can comprise at least one of at least one support, at least one filler and at least one binder. In another aspect, the solid acid component can comprise at least one of one or more amorphous solid acids, one or more crystalline solid acids and one or more supported acids. In one embodiment of the present invention, the solid acid catalyst comprises at least one molecular sieve. In a preferred embodiment, the molecular sieve comprises at least one of crystalline silicates, crystalline substituted silicates, crystalline aluminosilicates, crystalline substituted aluminosilicates, crystalline aluminophosphates, crystalline substituted aluminophosphates, zeolite-bound-zeolite, having 8- or greater-than-8 membered oxygen rings in framework structures. In another embodiment of the present invention, the solid acid component is at least one zeolite. The zeolite can comprise at least one of faujasite and MFI. The faujasite zeolite can be Y zeolite or modified Y zeolites such as dealuminated Y zeolite, high silica Y zeolite, rare earth-exchanged Y zeolite, etc. The MFI zeolite can be ZSM-5 zeolite or modified ZSM-5 zeolites such as phosphrous treated ZSM-5 zeolite and lanthanum treated ZSM-5 zeolite. In another embodiment of the present invention, the solid acid component can also be conventional FCC catalysts including catalysts containing zeolite Y, modified zeolite Y, Zeolite beta, and mixtures thereof, and catalysts containing a mixture of zeolite Y and a medium-pore, shape-selective molecular sieve species such as ZSM-5, or a mixture of an amorphous acidic material and ZSM-5. Such catalysts are described in U.S. Pat. No. 5,318,692, incorporated by reference herein.

In a further aspect of the present invention, the metal-based component comprises at least one perovskite crystal structure. Furthermore, the metal-based component can comprise at least one of at least one support, at least one filler and at least one binder.

In another aspect of the present invention, the element(s) from Group 3 are, preferably, at least one of scandium, yttrium, lanthanum, cerium, praseodymium, neodymium, samarium, europium, gadolinium, terbium, dysprosium, holmium, erbium, thulium, ytterbium, lutetium.

In another aspect of the present invention, preferably, the element(s) from Groups 4–15 is (are) at least one of titanium, vanadium, chromium, manganese, iron, cobalt, nickel, copper, zinc, boron, aluminum, phosphorous, gallium, germanium, zirconium, niobium, molybdenum, ruthenium, rhodium, palladium, silver, indium, tin, antimony, hafnium, tungsten, rhenium, iridium, platinum, gold, lead and bismuth.

In another aspect of the invention, the oxygen is preferred.

The weight ratio of solid acid component to the total weight of the metal-based component can be about 1000:1 to 1:1000. Preferably, this ratio is about 500:1 to 1:500. Most preferably, this ratio is about 100:1 to 1:100.

According to another aspect of the present invention, a process comprises simultaneously contacting a hydrocarbon feedstream under cracking conditions with a catalyst system comprising (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder.

It is believed that the inventive catalyst system is unique in that, among other things, it permits simultaneous catalytic cracking of hydrocarbon feedstreams to cracked products and combustion of resultant hydrogen to water. Preferably, the hydrogen combustion comprises selective hydrogen combustion. The selective hydrogen combustion can be anaerobic without the feeding of free-oxygen containing gas to the reaction, or it can be conducted with the feeding of free-oxygen containing gas.

Preferably, the yield of hydrogen is less than the yield of hydrogen when contacting said hydrocarbon feedstream(s) with said solid acid component alone under said catalytic reaction conditions. Preferably, the yield of hydrogen is at least 10% less than the yield of hydrogen when contacting said hydrocarbon feedstream(s) with said solid acid component alone under catalytic reaction conditions. More preferably, the yield of hydrogen is at least 25% less, more preferably at 50% less, even more preferably at least 75%, more preferably, at least 90%, and most preferably greater than 99% less than the yield of hydrogen when contacting said hydrocarbon feedstream(s) with said solid acid component alone under catalytic reaction conditions.

In a further aspect of the present invention, a catalytic cracking process comprises
(A) charging at least one hydrocarbon feedstream to a fluid catalytic cracking reactor,
(B) charging a hot fluidized cracking/selective hydrogen combustion catalyst system from a catalyst regenerator to said fluid catalytic cracking reactor, said catalyst system comprising: (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder,
(C) catalytically cracking said feedstream(s) and combusting resultant hydrogen at 300–800° C. to produce a stream of cracked products and uncracked feed and a spent catalyst system comprising said fluid catalytic cracking catalyst and said selective hydrogen combustion catalyst which are discharged from said reactor,
(D) separating a phase rich in said cracked products and uncracked feed from a phase rich in said spent catalyst system,
(E) stripping said spent catalyst system at stripping conditions to produce a stripped catalyst phase,
(F) decoking and oxidizing said stripped catalyst phase in a catalyst regenerator at catalyst regeneration conditions to produce said hot fluidized cracking/selective hydrogen combustion catalyst system, which is recycled to the said reactor, and
(G) separating and recovering said cracked products and uncracked feed.

Another aspect of the present invention relates to a process comprising contacting at least one hydrocarbon feedstream with a cracking/selective hydrogen combustion catalyst system under effective catalytic reaction conditions to produce cracked products and uncracked feed comprising liquid and gaseous hydrocarbons, wherein the yield of hydrogen is less than the yield of hydrogen when contacting said hydrocarbon feedstream(s) with said cracking catalyst alone under said catalytic reaction conditions. Preferably, the yield of hydrogen is at least 10% less than the yield of hydrogen when contacting said hydrocarbon feedstream(s) with said cracking catalyst alone under catalytic reaction conditions. More preferably, the yield of hydrogen is at least 25% less, more preferably at 50% less, even more preferably at least 75%, more preferably, at least 90%, and most preferably greater than 99% less than the yield of hydrogen when contacting said hydrocarbon feedstream(s) with said cracking catalyst alone under catalytic reaction conditions.

DETAILED DESCRIPTION OF THE PRESENT INVENTION

Unless otherwise stated, all percentages, parts, ratios, etc., are by weight.

Unless otherwise stated, certain terms used herein shall have the following meaning:

"paraffins" shall mean compounds having no carbon-carbon double bonds and either the formula $C_nH_{2n+2}$ or $C_nH_{2n}$, where n is an integer.

"naphthenes" shall mean compounds having no carbon-carbon double bonds and the formula $C_nH_{2n}$, where n is an integer.

"paraffinic feedstream" shall mean hydrocarbon feedstream containing some amount of paraffins but no olefins.

"olefins" shall mean non-aromatic hydrocarbons having one or more carbon-carbon double bonds.

"light olefins" shall mean ethylene, propylene, and, optionally, butylenes.

"light paraffins" shall mean methane, ethane, propane, and, optionally, butanes.

"catalyst to oil ratio" shall mean the relative amount of catalyst to hydrocarbon by weight.

"aromatics" shall mean compounds having one or more than one benzene ring.

"physical admixture" shall mean a combination of two or more components obtained by mechanical (i.e., non-chemical) means.

"chemically bound" shall mean bound via atom to atom bonds.

"cracking/selective hydrogen combustion" shall mean both cracking reaction and selective hydrogen combustion reaction.

"cracking catalyst" shall broadly mean a catalyst or catalysts capable of promoting cracking reactions whether used as base catalyst(s) and/or additive catalyst(s).

"selective hydrogen combustion catalyst" shall broadly mean a material or materials capable of promoting or participating in a selective hydrogen combustion reaction, using either free oxygen or lattice oxygen.

"cracking/selective hydrogen combustion catalyst" shall mean a catalyst system comprised of a physical admixture of one or more cracking catalysts and one or more selective hydrogen combustion catalysts, or one or more selective hydrogen combustion catalysts chemically bound to one or more cracking catalysts.

"cracking" shall mean the reactions comprising breaking of carbon-carbon bonds and carbon-hydrogen bonds of at least some feed molecules and the formation of product molecules that have no carbon atom and/or fewer carbon atoms than that of the feed molecules.

"Group 3 elements" shall mean elements having atomic numbers of 21, 39, 57 through 71, and 89 through 92.

"selective hydrogen combustion" shall mean reacting hydrogen with oxygen to form water or steam without substantially and simultaneously reacting hydrocarbons with oxygen to form carbon monoxide, carbon dioxide, and/or oxygenated hydrocarbons.

"yield" shall mean weight of a product produced per unit weight of feed, expressed in terms of weight %.

"Group 3 elements" shall mean elements having atomic numbers of 21, 39, 57 through 71, and 89 through 92.

Unless otherwise stated, a reference to an element, compound or component includes the element, compound or component by itself, as well as in combination with other elements, compounds or components, such as mixtures of compounds.

Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

The present invention relates to a catalyst system for treating a hydrocarbon feedstream. Such feedstream could comprise, by way of non-limiting example, hydrocarbonaceous oils boiling in the range of about 221° C. to about 566° C., such as gas oil, steam cracked gas oil and residues; heavy hydrocarbonaceous oils comprising materials boiling above 566° C.; heavy and reduced petroleum crude oil, petroleum atmospheric distillation bottom, petroleum vacuum distillation bottom, heating oil, pitch, asphalt, bitumen, other heavy hydrocarbon residues, tar sand oils, shale oil, liquid products derived from coal liquefaction processes, and mixtures therefore. Other non-limiting feedstream could comprise steam heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, $C_{5+}$ olefins (i.e., $C_5$ olefins and above), $C_{5+}$ paraffins, ethane, propane, butanes, butenes and butadiene. The present invention is also useful for catalytically cracking olefinic and paraffinic feeds. Non-limiting examples of olefinic feeds are cat-cracked naptha, coker naptha, steam cracked gas oil, and olefinic Fischer-Tropsch liquids. Non-limiting examples of paraffinic feeds are virgin naptha, natural gasoline, reformate and raffinate. Preferably, the hydrocarbon feedstream comprises at least one of paraffins, olefins, aromatics, naphthenes, and mixtures thereof, which produces light olefins, hydrogen, light paraffins, gasoline, and optionally, cracked naphtha, cracked gas oil, tar and coke. Typically, the cracked products from processes in accordance with the present invention comprise hydrogen, light olefins, light paraffins, and olefins and paraffins having more than five carbon atoms. Products can be liquid and/or gaseous.

The catalyst system of the present invention comprises (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder.

The solid acid component is described by the Brønsted and Lewis definitions of any material capable of donating a proton or accepting an electron pair. This description can be found in K. Tanabe. *Solid Acids and Bases: their catalytic properties*. Tokyo: Kodansha Scientific, 1970, p. 1–2. This reference is incorporated herein by reference in its entirety. The solid acid component can comprise at least one of solid acid, supported acid, or mixtures thereof. The solid acid component can comprise nonporous, microporous, mesoporous, macroporous or as a mixture thereof. These porosity designations are IUPAC conventions and are defined in K. S. W. Sing, D. H. Everett, R. A. W. Haul L. Moscou, R. A. Pierotti, J. Rouquérol, T. Siemieniewska, *Pure&Appl. Chem.* 1995, 57(4), pp. 603–619, which is incorporated herein by reference in its entirety.

Non-limiting examples of solid acid components are natural clays such as kaolinite, bentonite, attapulgite, montmorillonite, clarit, fuller's earth, cation exhange resins and $SiO_2.Al_2O_3$, $B_2O_3.Al_2O_3$, $Cr_2O_3.Al_2O_3$, $MoO_3.Al_2O_3$, $ZrO_2.SiO_2$, $Ga_2O_3.SiO_2$, $BeO.SiO_2$, $MgO.SiO_2$, $CaO.SiO_2$, $SrO.SiO_2$, $Y_2O_3.SiO_2$, $La_2O_3.SiO_2$, $SnO.SiO_2$, $PbO.SiO_2$, $MoO_3.Fe_2(MoO_4)_3$, $MgO.B_2O_3$, $TiO_2.ZnO$, $ZnO$, $Al_2O_3$, $TiO_2$, $CeO_2$, $As_2O_3$, $V_2O_5$, $SiO_2$, $Cr_2O_3$, $MoO_3$, $ZnS$, $CaS$, $CaSO_4$, $MnSO_4$, $NiSO_4$, $CuSO_4$, $CoSO_4$, $CdSO_4$, $SrSO_4$, $ZnSO_4$, $MgSO_4$, $FeSO_4$, $BaSO_4$, $KHSO_4$, $K_2SO_4$, $(NH_4)_2SO_4$, $Al_2(SO_4)_3$, $Fe_2(SO_4)_3$, $Cr_2(SO_4)_3$, $Ca(NO_3)_2$, $Bi(NO_3)$, $Zn(NO_3)_2$, $Fe(NO_3)_3$, $CaCO_3$, $BPO_4$, $FePO_4$, $CrPO_4$, $Ti_3(PO_4)_4$, $Zr_3(PO_4)_4$, $Cu_3(PO_4)_2$, $Ni_3(PO_4)_2$, $AlPO_4$, $Zn_3(PO_4)_2$, $Mg_3(PO_4)_2$, $AlCl_3$, $TiCl_3$, $CaCl_2$, $AgCl_2$, $CuCl$, $SnCl_2$, $CaF_2$, $BaF_2$, $AgClO_4$, and $Mg(ClO_4)_2$. Depending on the synthesis conditions, these materials can be prepared as nonporous, microporous, mesoporous, or macroporuous, as defined in the reference cited above. Conditions necessary to these preparations are known to those of ordinary skill in the art.

Non-limiting examples of solid acids can also include both natural and synthetic molecular sieves. Molecular sieves have silicate-based structures ("zeolites") and AlPO-based structures. Some zeolites are silicate-based materials which are comprised of a silica lattice and, optionally, alumina combined with exchangeable cations such as alkali or alkaline earth metal ions. For example, faujasites, mordenites and pentasils are non-limiting illustrative examples of such silicate-based zeolites. Silicate-based zeolites are made of alternating $SiO_2$ and $MO_x$ tetrahedral, where in the formula M is an element selected from Groups 1 through 16 of the Periodic Table (new IUPAC). These types of zeolites have 8-, 10- or 12-membered ring zeolites, such as Y, beta, ZSM-5, ZSM-22, ZSM-48 and ZSM-57.

Other silicate-based materials suitable for use in practicing the present invention include zeolite bound zeolites as described in WO 97/45387, incorporated herein by reference in its entirety. These materials comprise first crystals of an acidic intermediate pore size first zeolite and a binder comprising second crystals of a second zeolite. Unlike zeolites bound with amorphous material such as silica or alumina to enhance the mechanical strength of the zeolite, the zeolite bound zeolite catalyst does not contain significant amounts of non-zeolitic binders.

The first zeolite used in the zeolite bound zeolite catalyst is an intermediate pore size zeolite. Intermediate pore size zeolites have a pore size of from about 5 to about 7 Å and include, for example, AEL, MFI, MEL, MFS, MEI, MTW, EUO, MTT, HEU, FER, and TON structure type zeolites. These zeolites are described in *Atlas of Zeolite Structure Types*, eds. W. H. Meier and D. H. Olson, Butterworth-Heineman, Third Edition, 1992, which is incorporated herein by reference in its entirety. Non-limiting, illustrative examples of specific intermediate pore size zeolites are ZSM-5, ZSM-11, ZSM-12, ZSM-22, ZSM-23, ZSM-34, ZSM-35, ZSM-38, ZSM-48, ZSM-50 AND ZSM-57. Preferred first zeolites are galliumsilicate zeolites having an MFI structure and alumiminosilicate zeolites having an MFR structure.

The second zeolite used in the zeolite bound zeolite structure will usually have an intermediate pore size (e.g., about 5.0 to about 5.5 Å) and have less activity than the first zeolite. Preferably, the second zeolite will be substantially non-acidic and will have the same structure type as the first zeolite. The preferred second zeolites are aluminosilicate zeolites having a silica to alumina mole ratio greater than 100 such as low acidity ZSM-5. If the second zeolite is an aluminosilicate zeolite, the second zeolite will generally have a silica to alumina mole ratio greater than 100:1, e.g., 500:1; 1,000:1, etc., and in some applications will contain no more than trace amounts of alumina. The second zeolite can also be silicalite, i.e., a MFI type substantially free of alumina, or silicalite 2, a MEL type substantially free of alumina. The second zeolite is usually present in the zeolite bound zeolite catalyst in an amount in the range of from about 10% to 60% by weight based on the weight of the first zeolite and, more preferably, from about 20% to about 50% by weight.

The second zeolite crystals preferably have a smaller size than the first zeolite crystals and more preferably will have an average particle size from about 0.1 to about 0.5 microns. The second zeolite crystals, in addition to binding the first zeolite particles and maximizing the performance of the catalyst will preferably intergrow and form an overgrowth which coats or partially coats the first zeolite crystals. Preferably, the crystals will be resistant to attrition.

The zeolite bound zeolite catalyst is preferably prepared by a three-step procedure. The first step involves the synthesis of the first zeolite crystals prior to converting it to the zeolite bound zeolite catalyst. Next, a silica-bound aluminosilicate zeolite can be prepared preferably by mixing a mixture comprising the aluminosilicate crystals, a silica gel or sol, water and optionally an extrusion aid and, optionally, a metal component until a homogeneous composition in the form of an extrudable paste develops. The final step is the conversion of the silica present in the silica-bound catalyst to a second zeolite which serves to bind the first zeolite crystals together.

It is to be understood that the above description of zeolite bound zeolites can be equally applied to non-zeolitic molecular sieves (i.e., AlPO's).

Other molecular sieve materials suitable for this invention include aluminophosphate-based materials. Aluminophosphate-based materials are made of alternating AlO4 and PO4 tetrahedra. Members of this family have 8-(e.g., $AlPO_4$-12, -17, -21, -25, -34, -42, etc.) 10-(e.g., $AlPO_4$-11, 41, etc.), or 12-($AlPO_4$-5, -31 etc.) membered oxygen ring channels. Although $AlPO_4$s are neutral, substitution of Al and/or P by cations with lower charge introduces a negative charge in the framework, which is countered by cations imparting acidity.

By turn, substitution of silicon for P and/or a P—Al pair turns the neutral binary composition (i.e., Al, P) into a series of acidic-ternary-composition (Si, Al, P) based SAPO materials, such as SAPO-5, -11, -14, -17, -18, -20, -31, -34, -41, -46, etc. Acidic ternary compositions can also be created by substituting divalent metal ions for aluminum, generating the MeAPO materials. Me is a metal ion which can be selected from the group consisting of, but not limited to Mg, Co, Fe, Zn and the like. Acidic materials such as MgAPO (magnesium substituted), CoAPO (cobalt substituted), FeAPO (iron substituted), MnAPO (manganese substituted) ZnAPO (zinc substituted) etc. belong to this category. Substitution can also create acidic quaternary-composition based materials such as the MeAPSO series, including FeAPSO (Fe, Al, P, and Si), MgAPSO (Mg, Al, P, Si), MnAPSO, CoAPSO, ZnAPSO (Zn, Al, P, Si), etc. Other substituted aluminophosphate-based materials include ElAPO and ElAPSO (where El=B, As, Be, Ga, Ge, Li, Ti, etc.). As mentioned above, these materials have the appropriate acidic strength for reactions such as cracking. The more preferred aluminophosphate-based materials include 10- and 12-membered ring materials (SAPO-11, -31, -41; MeAPO-11, -31, -41; MeAPSO-11, -31, 41; ElAPO-11, -31, -41; ElAPSO-11, -31, -41, etc.) which have significant olefin selectivity due to their channel structure.

Supported acid materials are either crystalline or amorphous materials, which may or may not be themselves acidic, modified to increase the acid sites on the surface. Non-limiting, illustrative examples are $H_2SO_4$, $H_3PO_4$, $H_3BO_3$, $CH_2(COOH)_2$, mounted on silica, quartz, sand, alumina or diatomaceous earth., as well as heteropoly acids mounted on silica, quartz, sand, alumina or diatomaceous earth. Non-limiting, illustrative examples of crystalline supported acid materials are acid-treated molecular sieves, sulfated zirconia, tungstated zirconia, phosphated zirconia and phosphated niobia.

Although the term "zeolites" includes materials containing silica and optionally, alumina, it is recognized that the silica and alumina portions may be replaced in whole or in part with other oxides. For example, germanium oxide, tin oxide, phosphorus oxide, and mixtures thereof can replace the silica portion. Boron, oxide, iron oxide, gallium oxide, indium oxide, and mixtures thereof can replace the alumina portion. Accordingly, "zeolite" as used herein, shall mean not only materials containing silicon and, optionally, aluminum atoms in the crystalline lattice structure thereof, but also materials which contain suitable replacement atoms for such silicon and aluminum, such as gallosilicates, borosilicates, ferrosilicates, and the like.

Besides encompassing the materials discussed above, "zeolites" also encompasses aluminophosphate-based materials.

Mesoporous solid acids can be ordered and non-ordered. Non-limiting examples of ordered mesoporous materials include pillared layered clays (PILC's), MCM-41 and MCM-48. Non-limiting examples of non-ordered mesoporous materials include silica and titania-based xerogels and aerogels.

The solid acid component can also be conventional FCC catalyst including catalysts containing large-pore zeolite Y, modified zeolite Y, zeolite beta, and mixtures thereof, and catalysts containing a mixture of zeolite Y or modified zeolite Y and a medium-pore, shape-selective molecular sieve species such as ZSM-5 or modified ZSM-5, or a mixture of an amorphous acidic material and ZSM-5 or modified ZSM-5. Such catalysts are described in U.S. Pat. No. 5,318,692, incorporated by reference herein. The zeolite portion of the FCC catalyst particle will typically contain from about 5 wt. % to 95 wt. % zeolite-Y (or alternatively the amorphous acidic material) and the balance of the zeolite portion being ZSM-5. Useful medium-pore, shape-selective molecular sieves include zeolites such as ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No, 4,016,245. All of the above patents are incorporated herein by reference.

The large pore and shape selective zeolites may include "crystalline admixtures" which are thought to be the result of faults occurring within the crystal or crystalline area during the synthesis of the zeolites. Examples of crystalline admixtures of ZSM-5 and ZSM-11 are disclosed in U.S. Pat. No. 4,229,424 which is incorporated herein by reference. The crystalline admixtures are themselves medium pore, i.e., shape selective, size zeolites and are not to be confused with physical admixtures of zeolites in which distinct crystals of crystallites of different zeolites are physically present in the same catalyst composite or hydrothermal reaction mixtures.

The conventional FCC catalyst may contain other reactive or non-reactive components, such catalysts are described in European patent EP0600686B1, incorporated by reference herein.

The metal-based component of the catalyst system in accordance with the present invention is comprised of (1) at least one solid acid component, (2) at least one metal-based component comprised of one or more elements from Group 3 and one or more elements from Groups 4–15 of the Periodic Table of the Elements; and at least one of oxygen and sulfur, wherein the elements from Groups 3, Groups 4–15 and the at least one of oxygen and sulfur are chemically bound both within and between the groups and (3) at least one of at least one support, at least one filler and at least one binder. It is intended that reference to an element from each of the noted Groups would include mixtures of elements from the respective groups. For example, reference to one or more element from Groups 4–15 includes a mixture of chemically bound elements from Groups 4 and 15 of the Periodic Table.

This metal-based component can adopt a perovskite ($ABO_3$) crystal structure, where A and B are two distinct metal sites. Each metal site can comprise one or more metal cations from Group 1–15 of the Periodic Table of Elements. The crystal structure can be significantly distorted from the idealized cubic, perovskite structure depending on the choice of metals at A and B sites and/or due to the formation of oxygen vacancies upon reduction.

The metal-based component could be prepared, by way of non-limiting example, by combining salts or chalcogenides (compounds of the Group 16 elements) containing the desired parts through such means as evaporation or precipitation, followed by calcination. The solid acid component is then physically mixed or chemically reacted with the metal-based component and, optionally, combined with the binder to form catalyst particles.

The preparation of the metal-based component and solid-acid component are known to those of ordinary skill in the art. The metal-based component can be obtained through chemical means, such as the combination of metal salts and/or chalcogenides, in solution or slurry, followed by removal of the solvent or mother liquor via evaporation or filtration and drying. The metal-based component can then be ground and calcined. The solid acid and metal-based components can be physically admixed by mechanical mixing.

It is noted that rare earth elements are to be included as Group 3 elements. Preferably, the element(s) from Group 3 are at least one of scandium, yttrium, lanthanum, cerium, praseodymium, neodymium, samarium, europium, gadolinium, terbium, dysprosium, holmium, erbium, thulium, ytterbium, and lutetium.

The element(s) from Groups 4–15 can be any element or a mixture of elements from Groups 4–15 of the Periodic Table of the Elements. Preferably, the element(s) from Groups 4–15 is (are) at least one of titanium, vanadium, chromium, manganese, iron, cobalt, nickel, copper, zinc, boron, aluminum, phosphorous, gallium, germanium, zirconium, niobium, molybdenum, ruthenium, rhodium, palladium, silver, indium, tin, antimony, hafnium, tungsten, rhenium, iridium, platinum, gold, lead and bismuth.

The remaining component (2) of the catalyst system in accordance with the invention can be at least one of sulfur and oxygen. Oxygen is preferred.

The solid acid component and the metal-based component of the catalyst system in accordance with the present invention can be chemically bound. The chemically bound materials can then be subjected to the treatment of a matrix component. The matrix component serves several purposes. It can bind the solid acid component and the metal-based component to form catalyst particles. It can serve as a diffusion medium for the transport of feed and product molecules. It can also act as a filler to moderate the catalyst activity. In addition, the matrix can help heat transfer or serve as metal sinks.

Examples of typical matrix materials include amorphous compounds such as silica, alumina, silica-alumina, silica-magnesia, titania, zirconia, and mixtures thereof. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. The matrix material may also contain clays such as halloysite, kaolinite, bentonite, attapulgite, montmorillonite, clarit, fuller's earth, diatomaceous earth, and mixture thereof. The weight ratio of the solid acid component and the metal-based component to the inorganic oxide matrix component can be about 100:1 to 1:100.

In another aspect of the present invention, the solid acid component and the metal-based component of catalysts in accordance with the present invention may be treated separately with a matrix component. The matrix component for the solid acid component can be the same as or different from that for the metal-based component. One of the purposes of the treatment is to form particles of the solid acid component and particles of the metal-based component so that the components are hard enough to survive interparticle and reactor wall collisions. The matrix component may be made according to conventional methods from an inorganic oxide sol or gel, which is dried to "glue" the catalyst particle's components together. The matrix component can be catalytically inactive and comprises oxides of silicon, aluminum, and mixtures thereof. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. The matrix material may also contain clays such as kaolinite, bentonite, attapulgite, montmorillonite, clarit, fuller's earth, diatomaceous earth, and mixture thereof.

The weight ratio of the solid acid component to the matrix component can be about 100:1 to 1:100. The weight ratio of the metal-based component to the matrix component can be about 100:1 to 1:100

The solid-acid component particles and the metal-based component particles may be mixed to form a uniform catalyst system in the reactor or be packed in series to form a staged catalyst system in either a single reactor or two or more staged reactors.

The catalyst system of the present invention is multifunctional in that it both cracks a hydrocarbon feedstream and selectively combusts the hydrogen produced from the cracking reaction. The solid acid component of the catalyst system performs the cracking function and the metal-based component of the catalyst system performs the selective hydrogen combustion function. The catalyst system is particularly well-suited for cracking hydrocarbons to light olefins and gasoline. Conventional catalytic cracking generates hydrogen amongst other cracked products, which makes products recovery more difficult and costly. The catalyst system of the present invention can perform hydrocarbon cracking without a substantial co-production of hydrogen thereby reducing the investment and operating costs and/or creating more equipment volume for higher production capacity.

In accordance with the present invention, a catalyst system comprises a hydrocarbon cracking component and a selective hydrogen combustion component, which catalyst system, upon contact with a hydrocarbon feedstream, simultaneously cracks the hydrocarbon and selectively combusts the hydrogen produced from the cracking reaction. It is preferred that selective hydrogen combustion is conducted via an anaerobic mechanism which is related to the use of lattice oxygen from the selective hydrogen combustion component to promote selective hydrogen combustion.

Selective hydrogen combustion could also help supply the heat required for hydrocarbon cracking. The combustion of hydrogen is highly exothermic and, therefore, would be an ideal internal source of heat supply. This could reduce or even eliminate the need for external heat.

Thus, in accordance with the present invention, a catalytic cracking process comprises contacting a hydrocarbon feedstream with a catalyst system comprising a cracking/selective hydrogen combustion catalyst under suitable catalytic cracking/selective hydrogen combustion conditions to produce olefin, gasoline and other cracked products, wherein the catalytic cracking is conducted in a reduction of added heat. "Reduction of added heat" is meant that less than 98% of the total required heat input is added. More preferably, less than 95% of the total required heat input is added. Most preferably, less than 90% of the total required heat input is added. Since cracking reactions are endothermic, the required heat input is simply the overall enthalpy of the reaction. Thus, it is within the skill of one of ordinary skill in the art to calculate the required heat input.

In accordance with the present invention, a free-oxygen containing gas such as air or pure oxygen can be used as the source of oxygen for the selective hydrogen combustion reaction. The free-oxygen containing gas can be co-fed into the reaction vessel(s) with the hydrocarbon feedstream. Preferably, the lattice oxygen in the metal-based component of the catalyst system is used as the source of oxygen for the selective hydrogen combustion reaction (anaerobic hydrogen combustion). Higher selective hydrogen combustion selectivity and less $CO_x$ by-product are achievable using this approach as compared to co-feeding oxygen to the reactor. Using continuous catalyst regeneration technology would overcome the potential problem related to lattice oxygen being quickly consumed with resultant loss of catalyst activity.

The inventive process can be performed using any known reactor. By way of non-limiting, illustrative example, fixed-bed reactors with catalyst regeneration, moving bed reactors with catalyst regeneration such as the continuous catalyst regeneration reactor (also known as CCR), fluidized-bed processes such as a riser reactor with catalyst regeneration and the like would be suitable. A non-limiting illustrative example of a suitable fixed-bed catalyst regeneration system is illustrated in U.S. Pat. No. 5,059,738 to Beech, Jr. et al, which is incorporated herein by reference in its entirety. A non-limiting illustrative example of a suitable continuous catalyst regeneration moving bed reactor is illustrated in U.S. Pat. No. 5,935, 415 to Haizmann et al, which is incorporated herein by reference in its entirety. A preferred reactor system would be a downer-regenerator or a riser-regenerator system as described below for illustration purposes only. A riser-regenerator system that would be suitable for use in practicing the inventive process is disclosed in U.S. Pat. No. 5,002,653, which is incorporated herein by reference in its entirety.

In a riser-regenerator system, pre-heated hydrocarbon feed is contacted with catalyst in a feed riser line wherein the reaction primarily takes place. The temperature and pressure for the riser/reactor can be in the range of 300–800° C. and 0.1–10 atmospheres, respectively. The catalyst to hydrocarbon feed ratio, weight basis, can be in the range of 0.01 to 1000. The residence time in the reaction zone can be in the range of 0.01 second to 10 hours. As the reactions progress, the catalyst system is progressively deactivated due to a number of reasons including the consumption of lattice oxygen and the formation of coke on the catalyst surface. The catalyst system and hydrocarbon vapors are separated mechanically and hydrocarbons remaining on the catalyst are removed by steam stripping before the catalyst system enters a catalyst regenerator. The hydrocarbon vapors, are taken overhead to a series of fractionation towers for product separation. Spent catalyst system is reactivated in the regenerator by burning off coke deposits with air. The coke burn also serves as an oxidation treatment to replenish the catalyst system's lattice oxygen consumed in the reactor. The temperature and pressure for the regenerator can be in the range of 300–800° C. and 0.1–10 atmospheres, respectively. As required, a small amount of fresh make-up catalyst can be added to the reactor.

The cracking process of the present invention may also be performed in one or more conventional FCC process units under conventional FCC conditions in the presence of the catalyst system of this invention. Each unit comprises a riser reactor having a reaction zone, a stripping zone, a catalyst regeneration zone, and at least one fractionation zone. The feed is conducted to the riser reactor where it is injected into the reaction zone wherein the heavy feed contacts a flowing source of hot, regenerated catalyst. The hot catalyst vaporizes and cracks the feed and selectively combusts the resultant hydrogen at a temperature from about 475° C. to about 650° C., preferably from about 500° C. to about 600° C. The cracking reaction deposits carbonaceous hydrocarbons, or coke, on the catalyst system and the selective hydrogen combustion reaction depletes the lattice oxygen, thereby deactivating the catalyst system. The cracked products may be separated from the deactivated catalyst system and a portion of the cracked products may be fed to a fractionator. The fractionator separates at least a naphtha fraction from the cracked products.

The deactivated catalyst system flows through the stripping zone where volatiles are stripped from the catalyst particles with a stripping material such as steam. The stripping may be performed under low severity conditions in order to retain absorbed hydrocarbons for heat balance. The stripped catalyst is then conducted to the regeneration zone where it is regenerated by burning coke on the catalyst system and oxidizing the oxygen-depleted metal-based catalyst component in the presence of an oxygen containing gas, preferably air. Decoking and oxidation restore catalyst activity and simultaneously heats the catalyst system to, e.g., 650° C. to 800° C. The hot catalyst is then recycled to the riser reactor at a point near or just upstream of the second reaction zone. Flue gas formed by burning coke in the regenerator may be treated for removal of particulates and for conversion of carbon monoxide, after which the flue gas is normally discharged into the atmosphere.

The feed may be cracked in the reaction zone under conventional FCC conditions in the presence of the catalyst system of this invention. Preferred process conditions in the reaction zone include temperatures from about 475° C. to about 650° C., preferably from about 500° C. to 600° C.; hydrocarbon partial pressures from about 0.5 to 3.0 atmospheres, preferably from about 1.0 to 2.5 atmospheres; and a catalyst to feed (wt/wt) ratio from about 1 to 30, preferably from about 3 to 15; where catalyst weight is total weight of the catalyst composite. Though not required, it is also preferred that steam be concurrently introduced with the feed into the reaction zone, with the steam comprising up to about 15 wt. %, and preferably ranging from about 1 wt. % to about 5 wt. % of the feed. Also, it is preferred that the feed's residence time in the reaction zone be less than about 100 seconds, for example from about 0.01 to 60 seconds, preferably from 0.1 to 30 seconds.

In accordance with the present invention, the weight ratio of solid acid component to the total weight of metal-based component is from 1000:1 to 1:1000. More preferably, the ratio is from 500:1 to 1:500. Most preferably, the ratio is from 100:1 to 1:100.

EXAMPLES

The invention is illustrated in the following non-limiting examples, which are provided for the purpose of representation, and are not to be construed as limiting the scope of the invention. All parts and percentages in the examples are by weight unless indicated otherwise.

Example 1

This example illustrates the hydrogen yield during hydrocarbon cracking using a conventional zeolitic catalyst, without the addition of selective hydrogen combustion (SHC) catalyst. 4.0 grams of OlefinsMax (Grace Davison Division of W. R. Grace & Co.) were pelletized, crushed and screened to 30–50 mesh powder. It was then steamed at 700° C. for 2 hours. 1.0 gram of steamed OlefinsMax was then physically mixed with 2.5 grams of SiC (16–25 mesh), and loaded into a fixed-bed reactor for testing. The catalyst was heated to 540° C. in a helium stream at a flow rate of 105 cc/min (cubic centimeters per minute) and a pressure of 2–4 psig. The temperature was allowed to stabilize for 30 minutes prior to the addition of hydrocarbon feed. The feed consisted of 0.384 cc/min of 2-methylpentane or Light Virgin Naphtha (LVN) and 0.025 cc/min of liquid water. Following the introduction of hydrocarbon feed, product samples were collected every 30 seconds for a total time-period of 3.5 minutes using a multi-port, gas-sampling valve. The product was analyzed using a gas chromatograph equipped with flame ionization and pulsed discharge detectors. Table 1 shows the hydrogen and combined yield of $C_1$–$C_4$ products at various conversions of 2-methylpentane. When LVN was used as feed, similar hydrogen and $C_1$–$C_4$ yields were obtained when compared at the same feed conversion. A small $CO_X$ yield (typically, <0.1 wt %) was observed due to background contamination and/or hydrocarbon oxidation during post-reaction sampling/analysis.

TABLE 1

| 2-Methylpentane Conversion | $C_1$–$C_4$ Yield (wt %) | Hydrogen Yield (wt %) |
|---|---|---|
| 39.2 | 33.3 | 0.230 ± 0.012 |
| 21.1 | 18.6 | 0.131 ± 0.007 |
| 8.1 | 6.7 | 0.044 ± 0.002 |

Example 2

This example illustrates the preparation and performance of selective hydrogen combustion (SHC) catalyst for reducing the hydrogen yield in the product, while minimizing non-selective hydrocarbon oxidation. $LaMn_{0.4}Ni_{0.4}Al_{0.2}O_3$ catalyst was prepared by co-precipitation of metal salts using an organic base and a carbonate precursor. Solution A was prepared by dissolving 9.106 grams of lanthanum nitrate hexahydrate (Aldrich Chemical Company, Milwaukee, Wis.), 1.059 grams of manganese (II) chloride (Aldrich Chemical Company, Milwaukee, Wis.), 2.446 grams of nickel nitrate hexahydrate (Aldrich Chemical Company, Milwaukee, Wis.), and 1.578 grams of aluminium nitrate nonahydrate (Aldrich Chemical Company, Milwaukee, Wis.) in 210 grams of deionized water. Solution B was prepared by dissolving 13.3 grams of sodium bicarbonate (Mallinckrodt Baker Inc., Paris, Ky.) and 39.8 grams of tetraethylammonium hydroxide, 35 wt % solution (Alfa Aesar, Ward Hill, Mass.) in 631 grams of deionized water. Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol (VWR Scientific Products Corporation, Chicago, Ill.) followed by centrifugation to remove water, impurity cations/anions. This washing step was repeated to ensure complete removal of impurities. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 2 shows the results of the SHC test.

TABLE 2

| SHC Catalyst | $LaMn_{0.4}Ni_{0.4}Al_{0.2}O_3$ |
|---|---|
| % Conversion | 7.7 |
| C1–C4 Yield (wt %) | 6.7 |
| $H_2$ Yield (wt %) | 0.021 |
| % $H_2$ Conversion | 53 |
| $CO_x$ Yield (wt %) | 0.055 |
| % $H_2$ Selectivity | 81 |

The data in Table 2 demonstrates that significant reductions in hydrogen yield can be achieved through the addition of SHC catalyst. Compared to Example 1, there is a 53 percent reduction in hydrogen yield at similar hydrocarbon conversion and C1–C4 yields. Moreover, the SHC catalyst exhibits a high selectivity of 81 percent for hydrogen combustion, resulting in minimal $CO_x$ formation through non-selective hydrocarbon activation.

Example 3

This example illustrates the preparation and performance of selective hydrogen combustion (SHC) catalyst for reducing the hydrogen yield in the product, while minimizing non-selective hydrocarbon oxidation. $Sc_{0.9}Cu_{0.1}MnO_3$ catalyst was prepared by co-precipitation of metal salts using an organic base in alcoholic medium. Solution A was prepared by dissolving 3.642 grams of scandium nitrate hydrate (Alfa Aesar, Ward Hill, Mass.), 0.323 grams of copper (II) nitrate hydrate (Alfa Aesar, Ward Hill, Mass.), 1.681 grams of manganese (II) chloride (Aldrich Chemical Company, Milwaukee, Wis.) in 67 grams of deionized water. Solution B was prepared by dissolving 58 grams of tetraethylammonium hydroxide, 35 wt % solution (Alfa Aesar, Ward Hill, Mass.) in 225 grams of isopropanol (VWR Scientific Products Corporation, Chicago, Ill.). Solution A was slowed poured into a well-stirred solution B, resulting in precipitate formation. After aging the suspension for 1 hour, the particles were recovered by centrifugation at 1500–2000 rpm. The precipitate was then resuspended in 250 mL of isopropanol followed by centrifugation to remove water, impurity cations/anions. This washing step was repeated to ensure complete removal of impurities. The precipitate was dried in air at 25° C., ground to a fine powder using a mortar and pestle, and calcined to 800° C. for 2 hours in air. The sample was pelletized, crushed, and screened to 30–50 mesh prior to SHC testing.

1.0 grams of steamed OlefinsMax (prepared as described in Example 1) was physically mixed with 0.5 grams of SHC catalyst and 2.0 gram of SiC, and loaded into a fixed bed reactor. All other testing conditions were kept the same as in Example 1. Table 2 shows the results of the SHC test.

TABLE 3

| SHC Catalyst | $Sc_{0.9}Cu_{0.1}MnO_3$ |
|---|---|
| % Conversion | 8.0 |
| C1–C4 Yield (wt %) | 6.7 |
| $H_2$ Yield (wt %) | 0.023 |
| % $H_2$ Conversion | 48 |
| $CO_x$ Yield (wt %) | 0.174 |
| % $H_2$ Selectivity | 67 |

The data in Table 3 demonstrates that significant reductions in hydrogen yield can be achieved through the addition of SHC catalyst. Compared to Example 1, there is a 48 percent reduction in hydrogen yield at similar hydrocarbon conversion and C1–C4 yields. Moreover, the SHC catalyst exhibits a selectivity of 67 percent for hydrogen combustion, resulting in minimal $CO_x$ formation through non-selective hydrocarbon activation.

We claim:

1. A process for treating a hydrocarbon feedstream comprising simultaneously contacting the feedstream under cracking conditions with a catalyst system comprising (1) at least one molecular sieve, (2) at least one metal-based component comprised of one or more elements from Group 3 and one or more elements from Groups 4–15 of the Periodic Table of the Elements; and at least one of oxygen and sulfur, and wherein the elements from Groups 3, Groups 4–15 and the at least one of oxygen and sulfur are chemically bound both within and between the groups and (3) at least one of at least one support, at least one filler and at least one binder, wherein the hydrocarbon feedstream is cracked and the resultant hydrogen simultaneously combusted, said process further characterized by anaerobic selective hydrogen combustion, wherein the yield of hydrogen is less than the yield of hydrogen when contacting said hydrocarbon feedstream with said molecular sieve component alone under said catalytic reaction conditions, to produce liquid and gaseous hydrocarbons.

2. The process of claim 1, wherein the catalyst system is regenerated periodically.

3. The process of claim 1, wherein the weight ratio of molecular sieve component to the total weight of metal-based component is 1:1000 to 1000:1.

4. The process of claim 3, wherein the process temperature is from 300–800° C.

5. The process of claim 4, wherein the process pressure is from 0.1 to 10 atmospheres.

6. The process of claim 5, wherein the catalyst system to oil ratio is from 0.01 to 1000.

7. The process of claim 6, wherein the residence time is from 0.01 second to 10 hours.

8. The process of claim 1, wherein the molecular sieve component is at least one cracking catalyst and the metal-based component is at least one selective hydrogen combustion catalyst.

9. The process of claim 8, wherein the cracking catalyst is at least one of at least one fluid catalytic cracking base catalyst, at least one fluid catalytic cracking additive catalyst, and mixture thereof.

10. The process of claim 1, conducted in reduction of added heat.

11. The process of claim 1, wherein the yield of hydrogen is at least 10% less than the yield of hydrogen when contacting said hydrocarbon feedstream(s) with said molecular sieve component alone under said catalytic reaction conditions.

12. The process of claim 11, wherein the yield of hydrogen is at least 25% less than the yield of hydrogen when contacting said hydrocarbon feedstream(s) with said molecular sieve component alone under said catalytic reaction conditions.

13. The process of claim 12, wherein the yield of hydrogen is at least 50% less than the yield of hydrogen when contacting said hydrocarbon feedstream(s) with said molecular sieve component alone under said catalytic reaction conditions.

14. The process of claim 13, wherein the yield of hydrogen is at least 75% less than the yield of hydrogen when contacting said hydrocarbon feedstream(s) with said molecular sieve component alone under said catalytic reaction conditions.

15. The process of claim 14, wherein the yield of hydrogen is at least 90% less than the yield of hydrogen when contacting said hydrocarbon feedstream(s) with said molecular sieve component alone under said catalytic reaction conditions.

16. The process of claim 15, wherein the yield of hydrogen is greater than 99% less than the yield of hydrogen when contacting said hydrocarbon feedstream(s) with said molecular sieve component alone under said catalytic reaction conditions.

17. The process of claim 1, wherein the hydrocarbon feedstream comprises at least one of gas oil, steam cracked gas oil and residues; heavy hydrocarbonaceous oils comprising materials boiling above 566° C.; heavy and reduced petroleum crude oil, petroleum atmospheric distillation bottom, petroleum vacuum distillation bottom, heating oil, pitch, asphalt, bitumen, other heavy hydrocarbon residues, tar sand oils, shale oil, liquid products derived from coal liquefaction processes, steam heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, $C_{5+}$ olefins, $C_{5+}$ paraffins, ethane, propane, butanes, butenes and butadiene, olefinic and paraffinic feeds.

18. The process of claim 17, wherein the feedstream comprises at least one of paraffins, olefins, aromatics, and naphthenes.

19. The process of claim 1, wherein said metal-based component comprises an oxide and/or sulfide consisting essentially of La, Mn, Ni, and Al.

20. The process of claim 1, wherein said metal-based component comprises an oxide and/or sulfide consisting essentially of Sc, Cu, and Mn.

21. The prowess of claim 1, wherein said molecular sieve comprises at least one of crystalline silicates, crystalline substituted silicates, crystalline aluminosilicates, crystalline substituted aluminosilicates, crystalline aluminophosphates, crystalline substituted aluminophosphates, zeolite-bound-zeolite, having 8- or greater-than-8 membered oxygen rings in framework structures.

22. The catalyst system of claim 1, wherein said molecular sieve comprises at least one crystalline substituted aluminophosphate selected from the group consisting of SAPO, MeAPO, MeAPSO, ELAPO, and ELAPSO.

23. The catalyst system of claim 1, wherein said molecular sieve comprises Y zeolite.

24. The catalyst system of claim 1, wherein said molecular sieve comprises ZSM-5 zeolite.

25. The process according to claim 1, wherein said molecular sieve comprises a zeolite selected from y zeolite, ZSM-5, and mixtures thereof wherein the elements from Group 3 are selected from the group consisting of scandium, yttrium, lanthanum, cerium, praseodymium, neodymium, samarium, curopium, gadolinium, terbium, dysprosium, holmium, erbium, thulium, ytterbium, lutctium, and wherein the elements from Groups 4–15 are selected from the group consisting of titanium, vanadium, chromium, manganese, iron, cobalt, nickel, copper, zinc, boron, aluminum, phosphorous, gallium, germanium, zirconium, niobium, molybdenum, ruthenium, rhodium, palladium, silver, indium, tin, antimony, hafnium, tungsten, rhenium, iridium, platinum, gold, lead and bismuth.

26. The process according to claim 1, wherein said cracking and selective hydrogen combustion occurs at from about 475° C. to about 650° C.

27. The process according to claim 1, wherein said cracking and selective hydrogen combustion occurs at from about 500° C. to about 600° C.

* * * * *